(12) United States Patent
Gu et al.

(10) Patent No.: US 7,720,841 B2
(45) Date of Patent: May 18, 2010

(54) MODEL-BASED SELF-OPTIMIZING DISTRIBUTED INFORMATION MANAGEMENT

(75) Inventors: Xiaohui Gu, Chappaqua, NY (US); Philip S. Yu, Chappaqua, NY (US); Shu-Ping Chang, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 11/538,525

(22) Filed: Oct. 4, 2006

(65) Prior Publication Data
US 2008/0086469 A1 Apr. 10, 2008

(51) Int. Cl.
*G06F 13/14* (2006.01)
(52) U.S. Cl. ..................... 707/721; 707/966
(58) Field of Classification Search ........... 707/6
See application file for complete search history.

(56) References Cited

U.S. PATENT DOCUMENTS

| | | | | |
|---|---|---|---|---|
| 6,122,664 | A * | 9/2000 | Boukobza et al. | 709/224 |
| 2003/0208621 | A1 * | 11/2003 | Bowman | 709/242 |
| 2005/0010585 | A1 * | 1/2005 | Sahinoja et al. | 707/100 |
| 2005/0120105 | A1 * | 6/2005 | Popescu et al. | 709/223 |
| 2006/0106777 | A1 * | 5/2006 | Faunce et al. | 707/3 |
| 2006/0259460 | A1 * | 11/2006 | Zurek et al. | 707/2 |
| 2007/0299804 | A1 * | 12/2007 | Liu et al. | 707/1 |

OTHER PUBLICATIONS

Trigoni, Book Series Lecture Notes in Computer Science, Springer Berlin / Heidelberg, vol. 3560-2005, Distributed Computing in Sensor Systems, pp. 307-321.*

Bruno et al, STHoles: A Multidimensional Workload Aware Histogram, ACM SIGMOD Record archive vol. 30 , Issue 2 (Jun. 2001) table of contents pp. 211-222 Year of Publication: 2001 ISSN:0163-5808.*

R. Van Renesse et al.,"Astrolabe: A Robust & Scalable Technology for Distributed System Monitoring, Mgmt, & Data Mining", ACM Transactions on Computer Systems, 2003, p. 164-206.

A.R.Bharambe et al., "Mercury: Supporting Scalable Multi-Attribute Range Queries",SIGCOMM'04,Aug. 30-Sep. 3, 2004,14 pgs.,Portland,OR.

R. Huebsch et al., "Querying the Internet with PIER",Proceedings of the 29th VLDB Conference, 2003, 12 pgs, Berlin,Germany.

(Continued)

*Primary Examiner*—Tim T. Vo
*Assistant Examiner*—Gary J Koo
(74) *Attorney, Agent, or Firm*—Jon A. Gibbons; Fleit Gibbons Gutman Bongini & Bianco P.L

(57) ABSTRACT

Disclosed are a method, information processing system, and computer readable medium for managing data collection in a distributed processing system. The method includes dynamically collecting at least one statistical query pattern associated with a selected group of information processing nodes. The statistical query pattern is dynamically collected from a plurality of information processing nodes in a distributed processing system. At least one operating attribute distribution associated with an operating attribute that has been queried for the selected group is dynamically monitored. The selected group is dynamically configured, based on the query pattern and the operating attribute distribution, to periodically push a set of attributes associated with the each information processing node in the selected group.

20 Claims, 12 Drawing Sheets

OTHER PUBLICATIONS

Praveen Yalagandula et al., "A Scalable Distributed Information Managament System", SIGCOMM'04, Aug. 30-Sep. 3, 2004, 12 pgs., Portland, OR.

Nicholas Bruno et al., "STHoles:A Multidimensional Workload-Aware Histogram", ACM SIGMOD 2001,May 21-24, 2001, 12 pgs., Santa Barbara, CA.

* cited by examiner

MODEL-BASED SELF-OPTIMIZING DISTRIBUTED INFORMATION MANAGEMENT

STATEMENT REGARDING FEDERALLY SPONSORED RESEARCH OR DEVELOPMENT

This invention was made with Government support under Contract No. H98230-05-3-0001 awarded by U.S. Department of Defense. The Government has certain rights in this invention.

FIELD OF THE INVENTION

The present invention generally relates to the field of distributed stream processing systems, and more particularly relates to managing information within a distributed stream processing system.

BACKGROUND OF THE INVENTION

Federated computing infrastructures such as Computational Grids and service overlay networks ("SON") have become increasingly important to many emerging applications such as web service composition, distributed stream processing, and workflow management. As these computing infrastructures continue to grow, the efficient management of such large-scale dynamic distributed systems to better support application needs has become a challenging problem. Distributed information management services (which are further described in Robbert van Renesse, Kenneth Birman and Werner Vogels. Astrolab: A robust and scalable technology for distributed system monitoring, management, and data mining. *ACM Transactions on Computer Systems*, 21(2):164-206, May 2003; P. Yalagandula and M. Dahlin. A Scalable Distributed Information Management System. *Proc. of SIGCOMM* 2004, August 2004; and David Oppenheimer, Jeannie Albrecht, David Patterson and Amin Vahdat. Design and implementation trade-offs for wide area resource discovery. In HPDC-14, July 2005, respectively, and are herein incorporated by reference in their entireties) is one of the fundamental building blocks of system management, which can track dynamic system information and make it available via some query interfaces.

Applications running in the distributed environment can then query the current status of the system and make appropriate management decisions. For example, when a new application needs to be executed on a Grid system, a query "find 10 machines that have at least 20% free CPU time, 20 MB memory, and 2G disk space" can be issued to discover necessary resources.

However, providing scalable and efficient information management service for large-scale, dynamic distributed systems such as SONs is a challenging task. On one hand, quality sensitive applications running in such environment desire up-to-date information about the current system in order to better accomplish their application goals. On the other hand, the system can include a large number of geographically dispersed nodes (e.g., the World Community Grid consists of many thousands of nodes), and each node can be associated with many dynamic attributes (e.g., CPU load, memory space, disk storage, and other application level attributes). Obtaining accurate information about all nodes with their complete information inevitably involves high system overhead.

Distributed information management is critical for any large-scale system management infrastructure. For example, both the CoMon PlanetLab monitoring service and the Grid Monitoring/Discovery Service, (which are further described in K. Park and V. S. Pai. Comon: A mostly-scalable monitoring system for planetlab. *Operating Systems Review*, Vol 40, No 1, January 2006, and K. Czajlowski, S. Fitzgerald, I. Foster, and C. Kesselman. Grid information services for distributed resource sharing. In HPDC-10, 2001, respectively, and are herein incorporated by reference in their entireties), have proven extremely useful for their user communities. However, both systems are statically configured. Every node pushes all attribute data to a central server at fixed intervals, even when the attribute data are unlikely to satisfy application queries.

Astrolabe and SDIMS, (which are further described in enter Robbert van Renesse, Kenneth Birman and Werner Vogels. Astrolab: A robust and scalable technology for distributed system monitoring, management, and data mining. *ACM Transactions on Computer Systems*, 21(2):164-206, May 2003; P. Yalagandula and M. Dahlin. A Scalable Distributed Information Management System. *Proc. of SIGCOMM* 2004, August 2004, respectively, and are herein incorporated by reference in their entireties), are two representative scalable distributed information management systems. The primary focus of these systems is aggregation queries such as MIN, MAX, and SUM.

Other systems such as Mercury, SWORD and PIER, (which are further described in Ashwin R. Bharambe, Mukesh Agrawal, and Srinivasan Seshan. Mercury: Supporting scalable multi-attribute range queries. In *SIGCOMM* 2004, August 2004; David Oppenheimer, Jeannie Albrecht, David Patterson and Amin Vahdat. Design and implementation trade-offs for wide area resource discovery. In HPDC-14, July 2005, and Ryan Huebsch, Joseph M. Hellerstein, Nick Lanham, Boon Thau Loo, Scott Shenker and Ion Stoica. Querying the internet with PIER. In *Proceedings of 29th VLDB Conference*, 2003, respectively, and are herein incorporated by reference in their entireties), can support multi-attribute queries. However, their focus is on how to resolve queries in different decentralized architectures.

Additionally, there has been work on query pattern/workload estimation (such as that described in N. Bruno, S. Chaudhuri, and L. Gravano. Stholes: A multidimensional workload-aware histogram. In *ACM SIGMOID* 2001, May 2001, and Yi-Leh Wu, Divyakant Agrawal, and Amr El Abbadi. Query estimation by adaptive sampling. In 18th *International Conference on Data Engineering (ICDE'02)*, 2002, which are hereby incorporated by reference in their entireties), in the database community. The goal is often to build appropriate histograms to estimate the data distribution, so that different query plans can be evaluated more accurately.

Therefore a need exists to overcome the problems with the prior art as discussed above.

SUMMARY OF THE INVENTION

Briefly, in accordance with the present invention, disclosed are a method, information processing stream, and computer readable medium for managing data collection in a distributed processing system. The method includes dynamically collecting at least one statistical query pattern associated with a selected group of information processing nodes. The statistical query pattern is dynamically collected from a plurality of information processing nodes in a distributed processing system. At least one operating attribute distribution associated with an operating attribute that has been queried for the selected group is dynamically monitored. The selected group is dynamically configured, based on the query pattern and the operating attribute distribution, to periodically push a set of attributes associated with the each information processing node in the selected group In another embodiment an information processing system for managing data collection in a distributed processing system is disclosed. The information processing system comprises a memory and a processor that is communicatively coupled to the memory. An information management system is coupled to the memory and the processor. The information management system is for dynamically collecting at least one statistical query pattern associated with a selected group of information processing nodes. The statistical query pattern is dynamically collected from a plurality of information processing nodes in a distributed processing system. At least one operating attribute distribution associated with an operating attribute that has been queried for the selected group is dynamically monitored. The selected group is dynamically configured, based on the query pattern and the operating attribute distribution, to periodically push a set of attributes associated with the each information processing node in the selected group.

In yet another embodiment, a computer readable medium for managing data collection in a distribute processing system disclosed. The computer readable medium comprises instructions for dynamically collecting at least one statistical query pattern associated with a selected group of information processing nodes. The statistical query pattern is dynamically collected from a plurality of information processing nodes in a distributed processing system. At least one operating attribute distribution associated with an operating attribute that has been queried for the selected group is dynamically monitored. The selected group is dynamically configured, based on the query pattern and the operating attribute distribution, to periodically push a set of attributes associated with the each information processing node in the selected group.

One advantage of the present invention is that it provides a self-optimized distributed information management system. The information management system can dynamically/adaptively configure its data collection and query resolution operations based on dynamic query patterns and system conditions. Based on the statistical and node attribute distribution information, the information management system can dynamically configure a subset of worker nodes to periodically push a subset of their attribute data. The subset of nodes and attributes are selected so that most queries can be resolved by the push data. For the remaining queries, the information management system invokes pull operations on-demand to acquire the necessary information for their resolution

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Distributed Processing System

Figure 1:
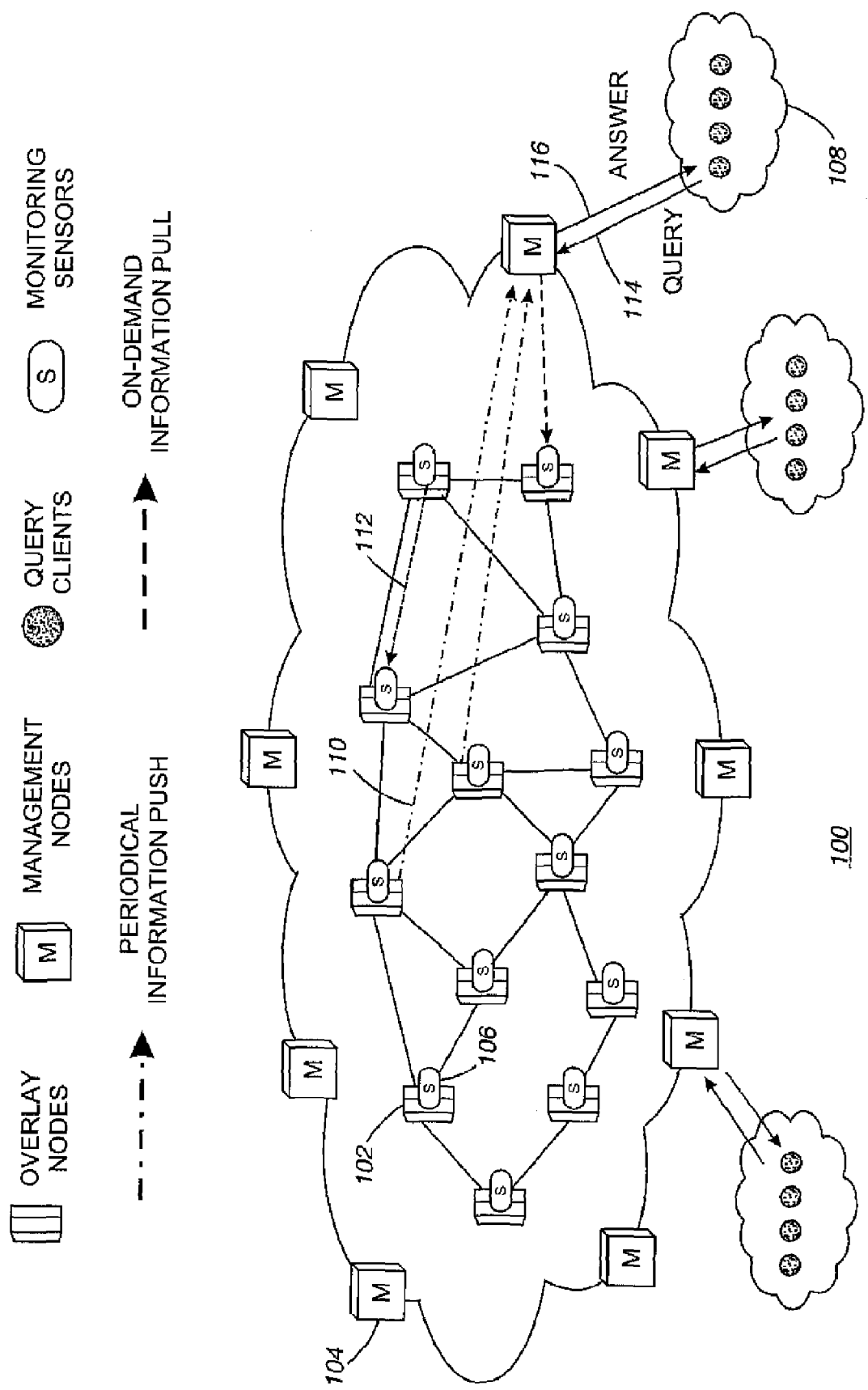
FIG. 1 is a block diagram illustrating a distributed processing system according to an embodiment of the present invention.

According to an embodiment of the present invention, as shown in FIG. 1, a high level overview of an exemplary distributed processing system 100 is shown. The distributed processing system 100 of FIG. 1 includes one or more overlay nodes 102, management nodes 104, and monitoring sensor modules 106. FIG. 1 also shows query clients 108 such personal computer, work stations, and the like. In one embodiment, the overlay nodes 102, in one embodiment, execute various application tasks. For example, an overlay node 102 (host node) is a processing node in the distributed processing system 100 that performs one or more stream processing functions (e.g., correlation, aggregation, select, etc.)

The management nodes 104 monitor the status of all overlay nodes 102 and perform system management tasks, for example, job scheduling, resource allocation, system troubleshooting, and the like. The monitoring sensor modules 106, in one embodiment, monitor each host overlay node 102 and provide information associated with the host overlay node 102 to each of the management nodes 104. In one embodiment, the sensor module 106 can be monitoring software that collects dynamic information about a local overlay node. An information management system 200 (FIG. 2) resides within each of the management nodes 104 and is discussed in further detail below. The information management system 200 resolves information queries from other system management modules or user applications.

In one embodiment, each overlay node 102, which can be a personal computer, workstation, or the like is monitored by one or more of the management nodes 104. Each overlay node 112 is associated with a set of attributes, for example, CPU load, number of disk accesses, and the like. In one embodiment the set of attributes for an overlay node 102 can be denoted as $A=\{a_1, \ldots, a_{|A|}\}$. Table 1 below summarizes the notations used throughout this discussion.

sory modules 106 reports its current attribute data to the management nodes 104. An information pull occurs when one or more management nodes 104 dynamically requests information from sensors to resolve one or more queries 114.

In one embodiment, the queries 114 received by the management node 104 such as those for service composition and distributed stream processing applications can expressed as locating a set of overlay nodes 102 that have certain resources. In other words, this set of overlay nodes 102 can be represented as $(a_1 \in [l_1, h_1]) \wedge (a_2 \in [l_2, h_2]) \ldots \wedge \ldots (a_k \in [l_k, h_k])$, where $l_i$ and $h_i$ are the desired lower bound and upper bound for $a_i$, respectively. Each query 114 can also specify the number of overlay nodes 102 that are needed. The query answer 116, in one embodiment, returns the specified number of overlay nodes 102, each of which satisfies the query predicate. Additionally, each query 114 can also specify a staleness constraint $T_i$ on a required attribute $a_i$. The staleness constraint $T_i$, in one embodiment, indicates a threshold for how old the attribute value used to resolve this query 114 can be. For example, the staleness constraint $T_i$ can indicate that the attribute value has to be less than or equal to $T_i$ seconds old. The staleness constraint gives applications more specific control on their query result. In one embodiment, if a query 114 does not specify such constraint, a default value (e.g., 30 seconds) can be used instead.

In one embodiment, each overlay node 102 includes a monitoring sensor module 106. The monitoring sensor module 106 can be implemented as hardware and/or software. The

TABLE I

Notations

| notation | meaning | notation | meaning |
| --- | --- | --- | --- |
| N | total number of overlay nodes | a | system state attribute |
| A | set of all attributes | A* | Subset of attributes to be pushed |
| $f_1 = \frac{|A^*|}{|A|}$ | fraction of pushed attributes | T | Push interval |
| $T_i^*$ | optimal push interval for $a_i$ | $T_i$ | Staleness constraint of a query |
| $S_1$ | size of push message | $S_2$ | Size of probe message |
| $\lambda$ | average query arrival rate | n | Average probing overhead |
| $p_1$ | % of resolvable queries using $A^*$ | $l_1$ | Lower bond requirement for $a_i$ |
| $l_i^*$ | (optimal) filtering threshold for $a_i$ | $f_2$ | % nodes in the push subspace |
| $p_2$ | % of queries in the push subspace | $p_3$ | % queries satisfied by the push intervals |

Each attribute $a_i$ is denoted by a name, for example, CPU, memory, or the like) and a value, for example 10%, 20 KB, or the like. It should be noted that unless stated otherwise $a_i$ is used throughout this discussion to represent both the name and value of the attribute. The management node 104, which in one embodiment can be an information processing system such as a personal computer, workstation, or the like, is responsible for monitoring the distributed system 100. The management node 104, in one embodiment, provides information to one or more query nodes 108 comprising applications requesting the information The query nodes 108 send a query 114 to the management node 104 wherein the management node 104 returns an answer 116 to the query 114. In one embodiment, the management node 104 is pushed information from the overlay nodes 102 as shown by the dashed-dotted lines 110 and/or pulls information from the overlay nodes 102 as shown by the dashed lines 112. This information is used by the management node 104 to provide the requested information to the query nodes 108. In one embodiment, an information push occurs when one or more monitoring senmonitoring sensor module 106 can be configured by the management node 104 to periodically push its information only when certain conditions are satisfied. The monitoring sensing module 106 can also respond to a dynamic probe with its current information. Such configurability allows the management node 104 to achieve adaptiveness based on statistical query patterns.

Exemplary Information Management System

Figure 2:
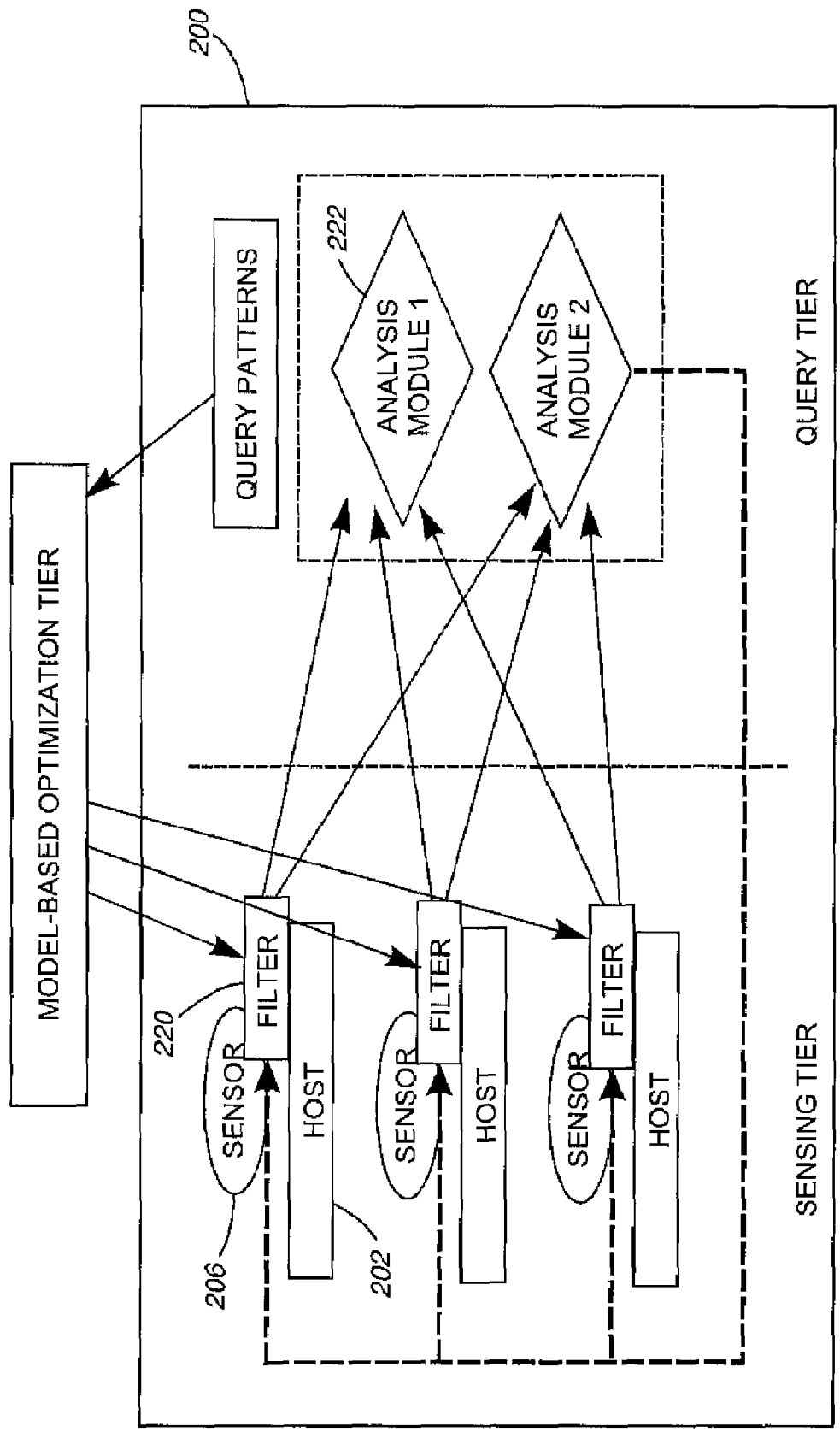
FIG. 2 is a block diagram illustrating an information management system according to an embodiment of the present invention.

FIG. 2 shows one example of an information management system 200 according to an embodiment of the present invention. The information management system 200, in one embodiment, is model-based and self-optimized. Therefore, the information management system 200 can adaptively configure its data collection and query resolution operations based on dynamic query patterns and system conditions. FIG. 2 shows the information management system 200 comprising host nodes 202 (overlay nodes), sensor modules 206 filtering modules 220, and analysis modules 222.

A host node 202, in one embodiment, is a processing node in the distributed processing system 100 that performs one or more stream processing functions (e.g., correlation, aggregation, select, etc.). A sensor module 206 can be monitoring software that collects dynamic information about local host 202. The filter module 220 is dynamically configured by the information management system 200 to filter out some raw monitoring data that is not needed by current queries. The selected information from the sensor 206 is sent to different analysis modules 222 (e.g., A1, A2, A3) that issue queries about different hosts 202. The information management system 200 dynamically derives query patterns from the queries generated by the different analysis modules 222. Based on the derived query patterns and attribute distributions, the information management system 200 dynamically configure the filters 220 on different hosts 2002 to minimize overall information management cost.

In one embodiment, the information management system 200 achieves its adaptivity by maintaining dynamic statistical information such as query patterns and system attribute distribution associated with the distributed system. The information management system 200 can then derive analytical models that characterize the system cost under different configurations. In one embodiment, the information management system 200 uses the statistical information and analytical models to dynamically configure a subset of the worker nodes (overlay nodes 102) to periodically push a subset of their attribute data. The subset of overlay nodes 102 and attributes are selected so that most queries can be resolved by the push data. For the remaining queries not in the subset, the information management system 200 invokes pull operations on-demand to acquire necessary information for their resolution.

The self-adaptive information management system 200, in one embodiment, can use a set of parameters for dynamically configuring the distributed processing system 100. The information management system 200 can dynamically configure the subset of attributes that should be pushed by the overlay nodes 102. The information management system 200 can also dynamically configure the push triggering threshold for each selected attribute, which filters out overlay nodes 102 that are unlikely to satisfy a query. An update interval for each pushed attribute can also be dynamically configured by the information management system 200 so that data is pushed at a frequency that the system can meet the staleness requirements of all queries with minimum push and pull cost. In one embodiment, the information management system 200 derives analytical models that characterize the system cost under different configurations and determines algorithms that can best configure the system parameters based on current query patterns and system conditions.

The information management system 200, in one embodiment, is optimized by using patterns so that queries are satisfied with minimum information monitoring overhead. The information management system 200 can exploit various query patterns such as frequently queried attributes, frequently queried range values, and frequent staleness constraints. When combined with statistical information about the distributed stream processing system 100 itself, these query patterns allow the information management system 200 to automatically configure itself in order to minimize its management cost.

The automatic self-configuration, in one embodiment is based on dynamically maintained statistical information about the queries and distributed processing system 100 conditions. The first statistical pattern, the frequently queried attributes, which can be denoted as A*, is collected because even though overlay nodes 102 can be associated with many attributes, it is likely only a subset of these attributes are frequently queried by current applications. For example, in distributed applications where computing jobs are mainly CPU-bound, most queries specify requirements on the CPU resource, but not on other attributes. By keeping track of those popular attributes and configuring the overlay nodes 102 to only report these attributes periodically, the information management system 200 can improve the system efficiency and avoid unnecessary system cost.

Figure 3:
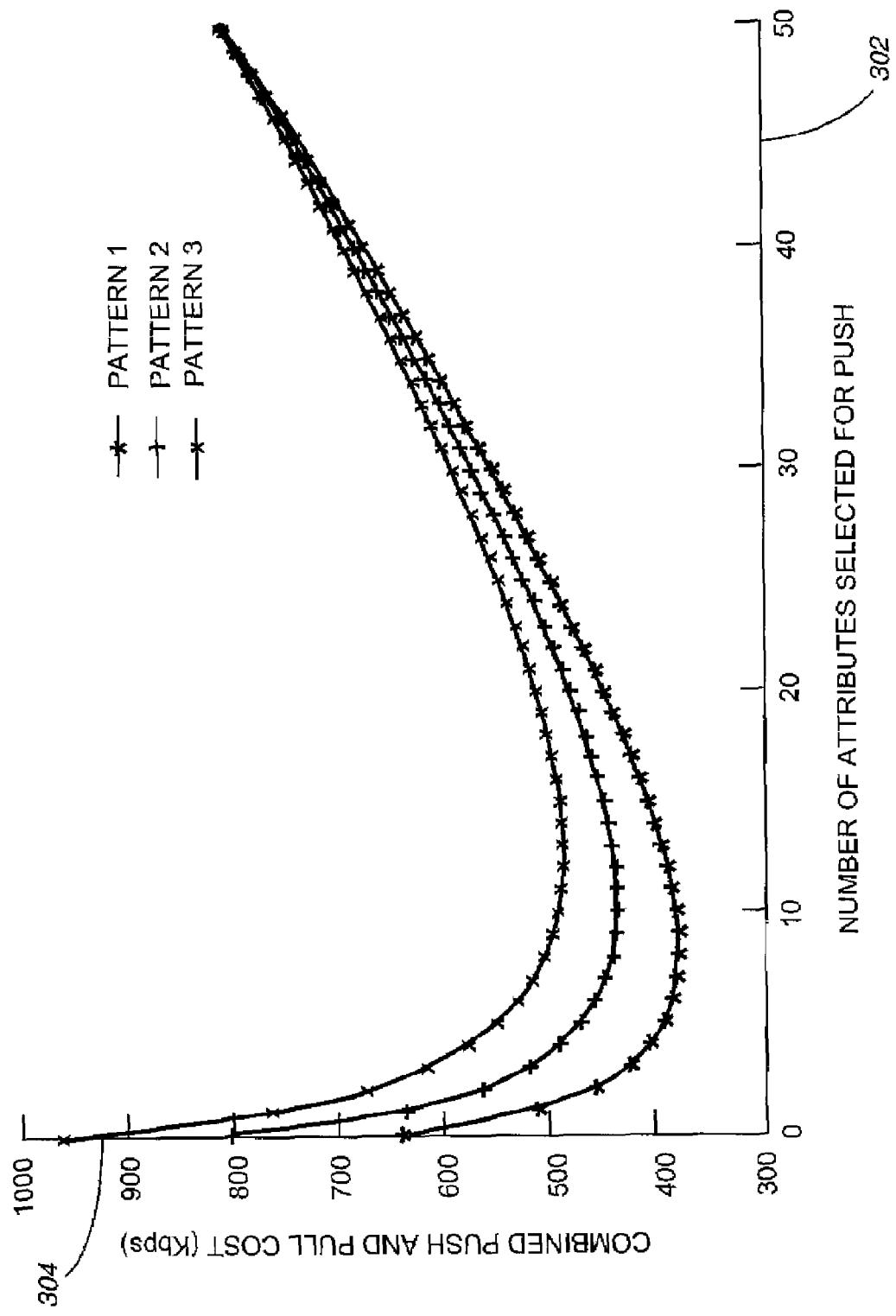
FIG. 3 is a two dimensional graph illustrating the effect of attribute solution according to an embodiment of the present invention.

For example, FIG. 3 shows a graph 300 illustrating the advantage of pushing only a subset of attributes. The example of FIG. 3 is based on a distributed processing system with 50 attributes. The x-axis 302 denotes the number of (most popular) attributes being pushed and the y-axis 304 denotes the corresponding system cost. FIG. 3 shows that for different query patterns, pushing a subset of the attributes is more advantageous than pushing no attributes (i.e., pure pull) or all attributes (i.e., pure push).

The statistical pattern of frequently queried range values, in one embodiment, allows the information management system 200 to further reduce the system cost by filtering out unqualified attribute values. For example, if most queries on CPU time require a node to have at least 20% free CPU time, the overlay nodes 102 with less than 20% CPU free time do not need to push their CPU value since they are unlikely to satisfy the query predicate. In one embodiment, the monitoring sensor module 106 can be configured by the information management system 200 with a push triggering range $[l_i, \infty)$ for each selected popular attribute $a_i \in A^*$. It should be noted that query predicates such as in resource queries often do not have upper-bound constraints. However, embodiments of the present invention can be extended to include a finite upper-bound.

Figure 4:
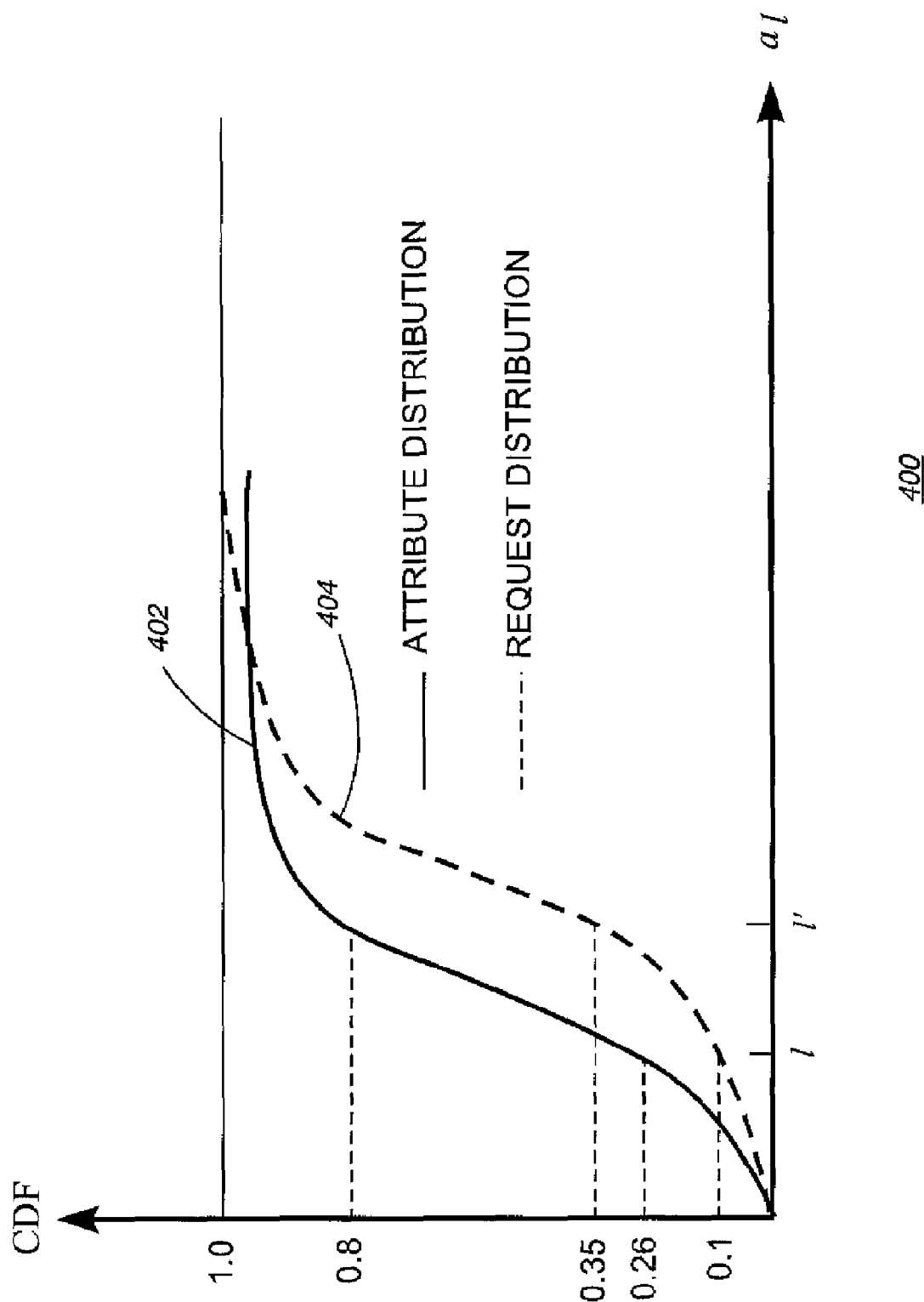
FIG. 4 is a two dimensional graph illustrating the effect of a filtering threshold according to an embodiment of the present invention.

In the above example, the monitoring sensor module 106 periodically pushes the attribute data only when the attribute value falls into the push triggering range. The range lower bound $l_i$, in one embodiment is a filtering threshold for the attribute. By setting a filtering threshold, the information management system 200 can filter out unnecessary data pushes without significantly decreasing the query hit ratio (i.e., the percentage of queries that can be resolved by the pushed data). FIG. 4 shows a graph 400 illustrating a filtering threshold selection for one attribute. The solid line 402 is the cumulative distribution function ("CDF") of an attribute $a_1$ across all N nodes. The dashed line 404 is the CDF of the lower bound requirements from the current queries. As FIG. 4 shows, 90% of the queries require the attribute to be greater than I, and only 74% of the overlay nodes 102 satisfy this requirement. Therefore, if the information management system 200 configures the filtering threshold to be I, then 74% of the overlay nodes 102 push their attribute data and 90% of the queries can be resolved by the pushed data.

However, if the information management system 200 increases the filtering threshold from I to I', then only 20% of the overlay nodes 102 need to push their attribute data with a slight decrease of query hit ratio. Thus, the query pattern range requirement distribution of recent queries is monitored by the information management system 200 to configure proper filtering thresholds. As discussed above, the information management system 200 also monitors the frequent staleness constraints query pattern. For example, when an application makes a query 114, the application can specify a staleness constraint $T_i$. The staleness constraint indicates that the attribute data used to resolve the query 114 cannot be greater than $T_i$ seconds old for attribute $a_i$. In one embodiment, different queries for any attribute $a_i \in A^*$ can have different staleness requirements. As a result, the push interval (i.e., update period) of $a_i$ is dynamically configured by the information management system 200 so that the push frequency is high enough to satisfy the staleness constraints of most queries. For example, if the staleness requirement is that the information should be no more than T seconds old, then the push frequency should be no lower than (1/T) times per second.

In addition to the query patterns, the information management system 200 also maintains an estimate of node attribute distribution (i.e., attribute distribution among all overlay nodes). The distribution can be used for two purposes. First, the information management system 200 can estimate the probing cost (i.e., the number of probes that are to be generated) based on the node attribute distributions. Second, the attribute distributions allow the information management system 200 to estimate the push cost reduction and pull cost increase when the filtering thresholds are configured for different attributes. In one embodiment, because the overlay nodes 102 can be associated with multiple attributes, the information management system 200 maintains multi-dimensional histograms to estimate the attribute distribution. The node attribute distribution can be obtained by executing infrequent aggregate queries (e.g., {\tt histogram}) over all the nodes.

As discussed above, the information management system 200 combines the push and pull for data collection thereby creating a management cost of a push cost and a pull cost. The push cost, in one embodiment, is the amount of data periodically delivered from different overlay nodes to the management node. The pull cost, in one embodiment, is the amount of data generated per time unit for pulling the attribute data in response to queries that cannot be resolved by the information management system 200 locally. One of the goals of the information management system 200 is to dynamically configure the monitoring sensor modules 106 so that the total system cost is minimized.

Corresponding to the application query patterns, there are at least three configuration parameters that the information management system 200 can tune. The first is the subset A* of attributes that are pushed. In other words, each monitoring sensor monitor 106 only periodically pushes a subset A* of attributes. When a query 114 arrives, if all the attributes the query 114 specifies is in A*, no additional cost is incurred. Otherwise, the information management system 200 uses an on-demand probing protocol identify enough nodes that satisfy the query. It should be noted that there are different ways for dynamic probing, e.g., using random sampling or on-demand spanning trees, or the like. Irrespective of the particular probing protocol, the information management system 200, in one embodiment, assumes (in order to resolve a query by probing) that on average n nodes need to be contacted with 2n messages. In one embodiment, n can be obtained from previous probes.

Since each monitoring sensor module 106 periodically (every T seconds) pushes $$f_1 = \frac{|A^*|}{|A|}$$

percentage of the attributes, it can be assumed that the message size is proportional to the number of attributes pushed, and $S_1$ is the size of the message if all $|A|$ attributes are pushed. The push cost of the system can be expressed as $$\frac{1}{T} N f_1 S_1.$$

For example, suppose the average query arrival rate is $\lambda$ and on average the information management system 200 needs to probe n nodes with 2n messages (probes and replies) to resolve a query by pull. Let $p_1$ denote the query hit ratio, and $S_2$ denote the size of a probe message. It should be noted that it is unlikely for a query 114 to specify requirements on many attributes, (as discussed in Ashwin R. Bharambe, Mukesh Agrawal, and Srinivasan Seshan. Mercury: Supporting scalable multi-attribute range queries. In *SIGCOMM* 2004, August 2004; which is hereby incorporated by reference in its entirety). Therefore, in one embodiment, it can be assumed that the message size for both probe and reply is $S_2$, which is a constant smaller than $S_1$. However, this is only notational simplicity and does not limit the present invention.

The pull cost of the entire distributed processing system 100 can then be $2n(1-p_1)\lambda S_2$. As a result, if only popular attributes are configured, and A* is the set of selected attributes, the total system cost is $$\frac{1}{T} N f_1 S_1 + 2n(1-p_1)\lambda S_2 \qquad \text{(EQ 1)}$$

A larger A* implies larger push cost (i.e., higher $f_1$) but a lower pull cost (i.e., lower $1-p_1$). Therefore, the information management system 200 dynamically selects A* based on the dynamically maintained statistical information, so that the overall system cost in Equation 1 above is minimized. Given a subset A* that has been selected, the information management system 200 can further reduce the system cost by selecting a filtering threshold $l_i^*$ for each attribute $a_i \in A^*$, and filtering out the overlay nodes 102 that do not satisfy the filtering thresholds. The set of filtering thresholds define a subspace $\{(a_1, a_2, \ldots, a_{|A^*|}) | a_1 > l_i^*, 1 \leq i \leq |A^*|\}$ in the $|A^*|$-dimensional space.

In one embodiment, an overlay node 102 is "covered" by the subspace, if its value for each attribute $a_1 \in A^*$ is above the filtering threshold. In one embodiment, a query 114 is "covered" by the subspace, if its lower bound requirement on each $a_i \in A^*$ is above the filtering threshold. If a query 114 is covered by the subspace, then all of the overlay nodes 102 that satisfy the query 114, which are called the answer set of the query 114, are covered by the subspace. Therefore, the query 114 can be locally resolved safely. For a query 114 not covered by the subspace, its answer set is not completely available. In this case, the information management system 200 assumes a probing operation is invoked so that the query result is not biased toward a subset of the answer set.

In one embodiment, an overlay node 102 reports its attribute data A* only if the node is covered by the subspace, and $f_2$ percent of the overlay nodes are covered by the subspace defined by the filtering thresholds. The push cost of the system is reduced to $$\frac{1}{T} f_2 N f_1 S_1$$

since only the $f_2$ percentage of overlay nodes 102 perform periodic pushes. Correspondingly, if $p_2$ percent of the queries (among those that only specify attributes in A* are covered by the subspace, a total of $(1-p_1p_2)$ percent queries need to be resolved by dynamic pull. As a result, the total system cost becomes $$\frac{1}{T}f_2Nf_1S_1 + 2n(1-p_2p_1)\lambda S_2 \qquad (EQ\ 2)$$

A lower $l_i^*$, $1 \leq i \leq |A^*|$ implies larger push cost (i.e., higher $f_2$) but lower pull cost (i.e., lower $(1-p_1p_2)$). Therefore, another goal of the information management system 200 is to select a set of proper filtering thresholds $l_i^*$ for all attributes $a_i \in A^*$ such that the total system cost in Equation 2 above is minimized.

To further reduce the system cost, each overlay node 102 can push the value of $a_i \in A^*$ every $T_i^*$ seconds when the value is above the filtering threshold. The push cost for attribute $a_i$ becomes $$\frac{1}{T_i^*}f_2Nf_1S_1 + 2n(1-p_2p_1)\lambda S_2.$$

Thus, the total push cost for all selected attributes is $$\sum_{a_i \in A^*} \frac{1}{T_i^*}f_2N\frac{S_1}{|A|}.$$

Suppose under the above configuration, $p_3$ percent of queries (among the $p_2p_1$ percent of queries that specify attributes in A* and are covered by the subspace defined by the filtering thresholds) can satisfy their staleness constraints. Then a total of $(1-p_3p_2p_1)$ percent queries need to invoke pull operations. Therefore, the total system cost for all three configuration parameters is $$\sum_{a_i \in A^*} \left(\frac{1}{T_i^*}f_2N\frac{S_1}{|A|}\right) + 2n(1-p_3p_2p_1)\lambda S_2 \qquad (EQ\ 3)$$

A lower $T_i^*$, in one embodiment, means higher push cost but lower pull cost due to a higher $p_3$. Besides the monitoring cost, the information management system 200 also considers the query response time requirements. Generally, if the query 114 can be answered by the push data (i.e., a query hit) then the query response time is shorter than the when the query resolution involves pull operations (i.e., a query miss). Suppose the average response time for a query hit is $R_1$ and the average response time for a query miss is $R_2$. $\alpha$ can denote the query hit ratio and $R^{req}$ can denote the user required query response time constraint. Then, the optimal distributed information management problem can be formulated into the following constrained optimization problem, wherein the problem of optimal distributed information management is to adaptively select a subset of attributes A*, a filtering threshold l*, and a push interval $T_*$, for each attribute $\in A^*$, such that $$\sum_{a_i \in A^*} \left(\frac{1}{T_i^*}f_2N\frac{S_1}{|A|}\right) + 2n(1-p_3p_2p_1)\lambda S_2 \qquad (EQ\ 4)$$

is minimized subject to $$\alpha \cdot R_1 + (1-\alpha) \cdot R_2 \leq R^{req} \qquad (EQ\ 5).$$

As discussed above, the pattern-driven self-configuring information management system 200 minimizes the system management cost by observing both query patterns and attribute distributions. Each management node 104, in one embodiment, performs this cost minimization process in response to the changes of query patterns and node attribute distributions.

Attribute Selection

One of the goals of the attribute selection process performed by the information management system 200 is to select a subset of attributes $A^* \subseteq A$ so that the total system cost is minimized. According to Equation 1 above, A* can affect the push cost (i.e., $f_1 = A^*/A$ percent of complete attribute push cost) and the percentage $p_1$ of queries 114 that can be resolved by a management node 104 using the push data (i.e., query hit ratio). A larger A* implies a larger push cost but also a larger query hit ratio, while smaller A* implies a smaller push cost but also lower query hit ratio and thus higher pull cost. Therefore, the selection A*, in one embodiment, represents the trade-off between the push cost and pull cost. In one embodiment, the information management system 200 selects a proper subset A* such that the combined push and pull cost is minimized.

To quantify the relative merit of pushing a subset of attributes $A_i$, the information management system 200 groups the queries 114 based on the subset of attributes specified by the queries 114. For example, the information management system 200 uses a subset $A_i = \{a_1, a_2\}$ to represent all queries 114 that specify requirements on attributes $a_1$ and $a_2$. For each subset $A_i$ the information management system 200 can determine a query frequency, denoted by freq($A_i$), which means the percentage of all queries that are represented by $A_i$. Suppose the monitoring sensor modules 106 are configured by the information management system 200 to push the attribute data in $A_i$. For any $A_j \subseteq A_i$, the queries that are represented by $A_j$ can also be resolved by the push data. Therefore, cumulative query frequency of $A_i$ can be defined as freq$'(A_i) = \Sigma_{A_j \subseteq A_i}$freq($A_j$). This indicates the percentage of queries that can be resolved by the push data if the attributes in $A_i$ are pushed.

Given the above, the relative cost reduction of a subset $A_i$ can be defined to be the amount of pull cost saved minus the additional push cost incurred, if all attributes in $A_i$ are pushed, which can be calculated as follows, $$2n \cdot freq'(A_i)\lambda S_2 - \frac{1}{T}N\frac{|A_i|}{|A|}S_1 \qquad (EQ\ 6)$$

One example of a push attribute selection algorithm is described as follows and whose pseudo-code is given in Table 2 below.

TABLE 2

Push attribute selection algorithm.

Attribute Selection (T, N, A, $S_1$, $S_2$, n, $\lambda$)
1.    let $f_1 = p_1 = 0$, and $A^* = \theta$
2.    compute min_cost using Equation(1)
3.    let $C = \{A_i \in A | freq(A_i) > 0\}$
4.    while $C \neq \theta$ do
5.        for each $A_i \in C$ compute $freq'(A_i)$
6.        select $A_i$ from C that has the largest cost reduction
7.        if the cost reduction of $A_i$ is negative than break
8.    
$$f_1 = f_1 + \frac{|A_i|}{|A|}$$
9.        $p_1 = p_1 + freq'(A_i)$
10.       compute min_cost using Equation(1)
11.       $A^* = A^* \cup A_i$
12.       for each $A_j \in C$ set $A_j = A_j \backslash A_i$
13.       merge duplicate subsets in C
14.   return $A^*$ Let C denote the collection of attribute subsets, each corresponding to a set of queries that specify the same attributes. Initially, A* is set to be empty, on other words, no attributes are pushed. Thereafter, the subset $A_i$ with the largest cost reduction is repeatedly selected, and add $A_i$ to A*. The attributes in $A_i$ are removed from all other subsets in C. This can create duplicate subsets in C. For example, after the attributes in $A_i=\{a_1,a_2\}$ are removed, the two subsets $\{a_1,a_3\}$ and $\{a_2,a_3\}$ are the same as each other. These subsets are then merged, and the cumulative query frequency is recomputed.

The above process is repeated, until either all attributes have been added to A* or if a new attribute subset is added total system cost increases. To implement the algorithm, the information management system 200 within a management node 104 keeps a sliding window of recently received queries and a moving average of $p_1$. $p_1$ is the percentage of queries that only specify attributes in A*. When the observed $p_1$ is significantly different from the value predicted by the information management system 200, a reconfiguration is triggered. It should be noted that the size of the sliding window and the reconfiguration triggering threshold decide how promptly the information management system 200 can respond to query pattern changes, and how often push attribute selection is performed.

In a worst case scenario, the while loop at line 4 in Table 2 is executed |C| times. For each loop, line 5 in Table 2 takes $O(|C|^2)$ time because every pair of subsets need to be compared for inclusion test. The inclusion test for two subsets takes $O(k^2)$ time, assuming k is the maximum number of attributes in a query. As a result, the worst case time complexity of the algorithm is $O(|C|^3 k^2)$.

Filtering Threshold

Figure 5:
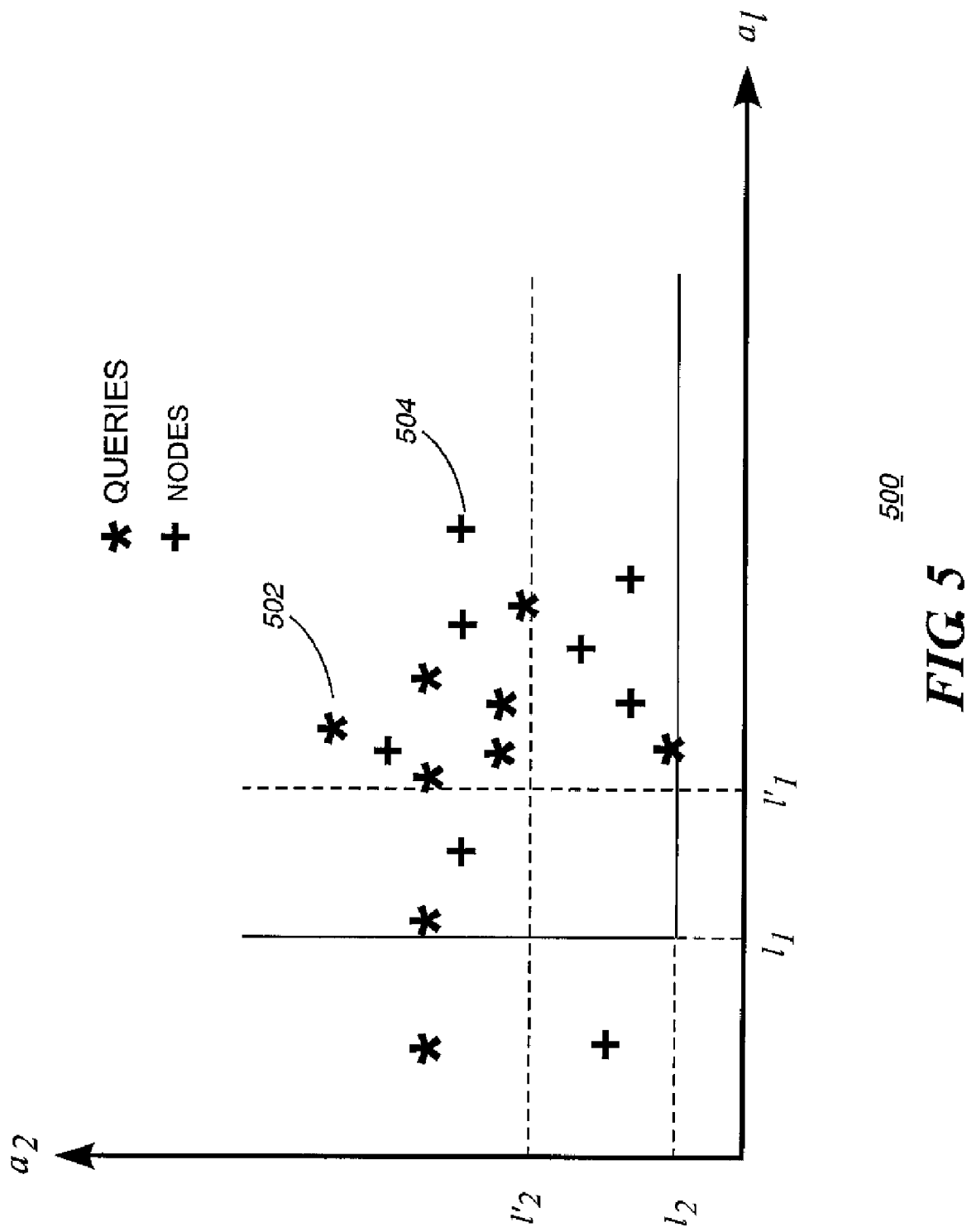
FIG. 5 is a two dimensional graph illustrating a two-dimensional subspace selection according to an embodiment of the present invention.

As discussed above, the information management system 200 selects a filtering threshold. In other words, the information management system 200 selects a multi-dimensional subspace that can cover the optimal set of overlay nodes 102 and queries 114. FIG. 5 shows a graph 500 illustrating the subspace selection problem in a two-dimensional space. Each star 502 in the space corresponds to a query 114, and each plus sign 504 corresponds to an overlay node 102. As can be seen from FIG. 5, if the filtering threshold for $a_1$ and $a_2$ is set to be $l_1$ and $l_2$ respectively, one overlay node 102 does not push its attribute data. This is because the overlay node 102 is not covered by the subspace $\{(a_1,a_2)|a_1 \geq l_1 \wedge a_2 \geq l_2\}$. One query 114 needs to be resolved by the pull operation, because it is not covered by the subspace. However, if the filtering threshold is set to be $l_1'$ and $l_2'$, five overlay nodes do not need to push their data, and three queries need to be resolved by the pull operations.

Figure 6:
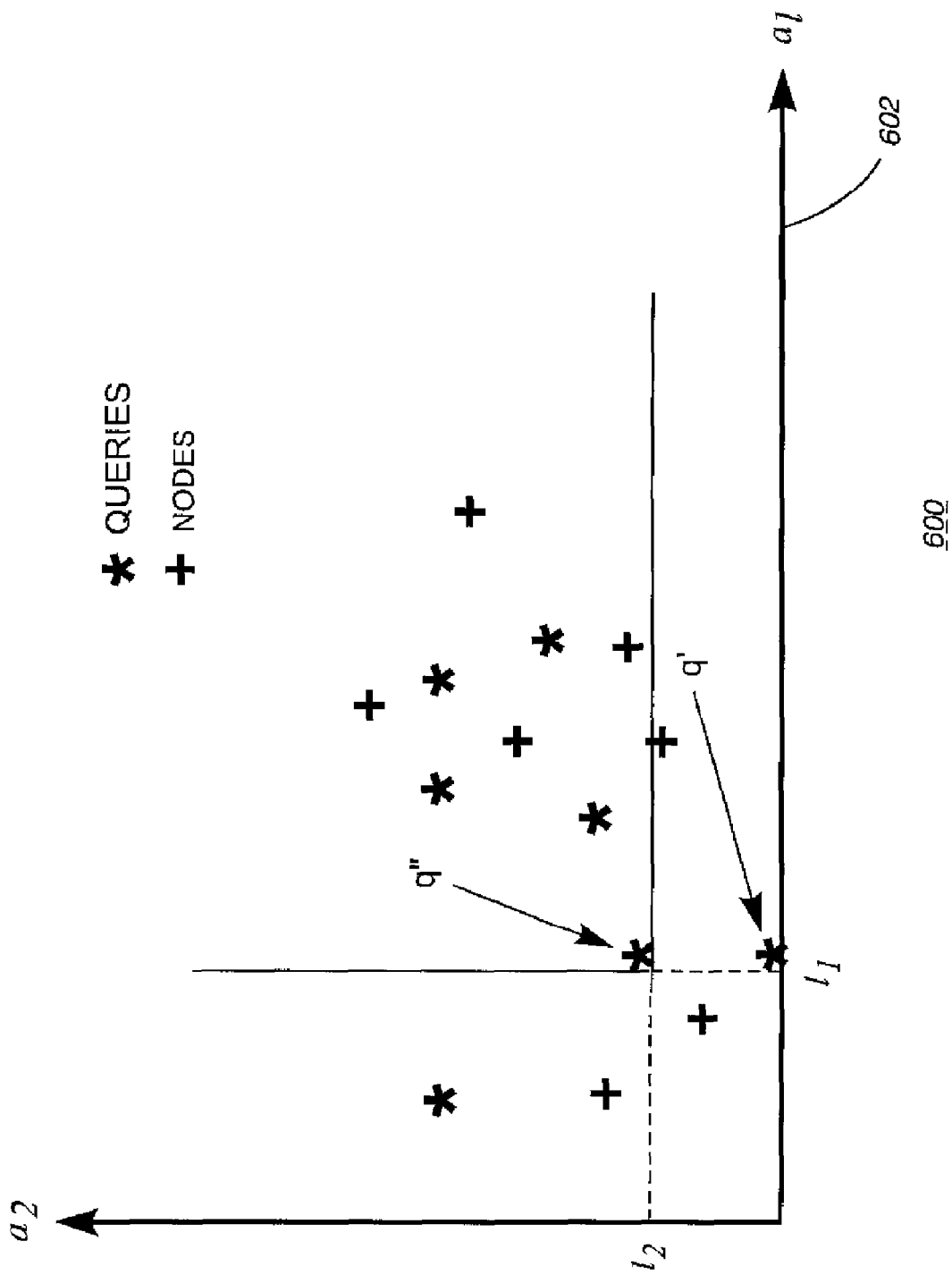
FIG. 6 is a two dimensional graph illustrating query positioning according to an embodiment of the present invention.

In the above description, it is assume that each query 102 has all |A*| coordinates, which means that it specifies requirements on each attribute $a_i \in A^*$. In one embodiment, a query 114 may only specify a subset of the attributes in A*. Under those circumstances, the information management system 200 determines where to place the query 114 in the |A*|-dimensional space such that the subspace selection process can correctly classify it as resolvable by push data or not. This procedure is referred to "query positioning". The following is an example illustrating the positioning procedure and is shown in FIG. 6. FIG. 6 shows a graph 600 illustrating a two-dimensional space (i.e., $A^*=\{a_1,a_2\}$) and a query $q=(a_1 \geq l_1)$.

One intuitive way to place the query in the two dimensional space is to rewrite the query as $q'=(a_1 \geq l_1 \wedge a_2 \geq 0)$. Hence, the query is placed on the $a_1$ axis 602. This, however, greatly limits the filtering capability of threshold selection since in order to cover this query, the threshold for $a_2$ must be 0. Therefore, the information management system 200 utilizes the node attribute distribution information to achieve more accurate query placement. For example, if the information management system 200 determines that among the overlay nodes 102 that satisfy $a_1 \geq l_1$, the smallest $a_2$ value is $l_2$. the query 114 can be rewritten as $q''=(a_1 \geq l_1 \wedge a_2 \geq 0)$. It should be note that this does not change the set of nodes that satisfy the query. However, it does affect the classification of queries as locally resolvable or not. If the push attributes for $a_1$ and $a_2$ are set to $l_1$ and $l_2$, respectively, q" is covered by the subspace, while q' is not. Using the (conditional) attribute distribution, the queries 114 can be placed more accurately.

In one embodiment, query positioning requires the queries to be ran against the node attribute distribution. Multi-dimensional histograms can be used to estimate the attribute distribution of the nodes and queries. It should be noted that the query distribution is incrementally updated as queries arrive at the management node 104. The node attribute distribution is periodically updated by executing an information aggregation query over all the nodes. Since the dimension might be high, only keep the bins that are non-empty are kept. Suppose all the attribute values are normalized to [0, 1.0], and the bin size for each dimension is d. Let B be the list of non-empty bins for the node attribute distribution. Each bin $b_i \in B$ is described by a tuple of |A*|+1 fields.

The first |A*| fields define the bin, and the last field is the percentage of nodes in the bin. For example, $b=(v_1,v_2,\ldots,v_{|A^*|},0.1)$ means 10% of the machines have attribute $a_i \in [v_i, v_i+d), 1 \leq i \leq |A^*|$. Similarly, let B' be the set of bins for the queries. B and B' are bounded by the number of nodes in the system and the number of historical queries that are kept for estimating query patterns, which are smaller than a complete multi-dimensional histogram. Suppose the current filtering threshold is $l_j^*$ for attribute $a_j$. If a particular attribute $a_j$ is analyzed and $l_j^*$ is increased to $l_j^*+d$, the information management system 200 can determine how many overlay nodes 102 are removed from the subspace. The information management system 200 can also determine how many queries are removed from the subspace. This allows the information management system 200 to determine a cost reduction (i.e., the amount of push cost reduced minus the pull cost increased) for increasing $l_j^*$ to $l_j^*+d$.

Therefore, the information management system 200 performs at least one or more of the following for configuring a filtering threshold. First, each filtering threshold $l_i^*$ is initialized to be zero, which means every overlay node 102 periodically pushes its attribute data without any threshold filtering. Next, at each step, the information management system 200 selects one attribute $a_i$ that has the largest cost reduction and increases the filtering threshold $l_i^*$ by a step size d. The information management system 200 the removes the overlay nodes 102 and queries 114 that are not covered by the new subspace. The above process is repeated until the increase of any filtering threshold does not cause the system cost to decrease, or all overlay nodes 102 have been removed. Removal of all overlay nodes 102 indicates that all of the queries 114 have been resolved by the pull operations.

In the algorithm for configuring a filtering threshold whose pseudo-code is shown below in Table 3, the while loop at line 4 executes at most $|B|=O(N)$ times. In each loop, line 5 computes the cost reduction for each dimension $a_i$. To do this, the number of nodes and queries that are removed is computed when $l_i^*$ is increased. This takes $O(|A^*|(|N|+|B'|))$ time. As a result, line 5 takes $O(|A^*|(N+|B'|)N)$ time. In one embodiment, N is often smaller than $|B'|$ decided by the number of queries. Thus, the computational complexity of the algorithm is $O(|A^*|\cdot N\cdot|B'|)$.

TABLE 3

Filtering threshold selection algorithm.

FilteringThresholdSelection(T, N, A, $S_1$, $S_2$, n, $\lambda$, A*)
1. let $l^*_i = 0, 1 \leq i \leq |A^*|$ and $f_2 = p_2 = 1$
2. compute min_cost according to Equation (2)
3. let B and B' be the bins for nodes and queries
4. while B $\neq \theta$ do
5.     select $a_i$ that has the largest cost reduction
6.     if the cost reduction is < 0 then break
7.     increase $l_i^*$ to $l_i^* + \delta$
8.     remove all nodes and queries not covered by $\{l_i^*\}$
9.     reduce the cost reduction from min_cost
10. return $\{l_i^*\}$ Push Interval The push interval configuration process performed by the information management system 200 can be described as follows. Suppose the information management system 200 selects a push interval $T_i^*$ for each attribute $a_i \in A^*$. In one embodiment, the push interval determines how often a monitoring sensor module 106 reports up-to-date attribute values to the management node 104 when the value is above the filtering threshold. On one hand, push intervals can affect the system's push cost since they decide the push frequency of the selected attributed data. On the other hand, push intervals also affect how many queries can be resolved by the push data satisfying their stableness constraints. A larger $T_i^*$ means the attribute is pushed less frequently, and the pushed data is less likely to satisfy the staleness constraint of a query. The push interval configuration algorithm is similar to the filtering threshold configuration algorithm. Starting from the minimum push interval for each attribute, the information management system 200 repeatedly selects an attribute $a_i$ and increases its corresponding push interval $T_i^*$. The attribute $a_i$ is selected such that the increase of $T_i^*$ results in the largest cost reduction. The above process is repeated until either the increase of $T_i^*$ leads to increased system cost, or when all the push intervals have reached their maximum values.

System Architecture

Figure 7:
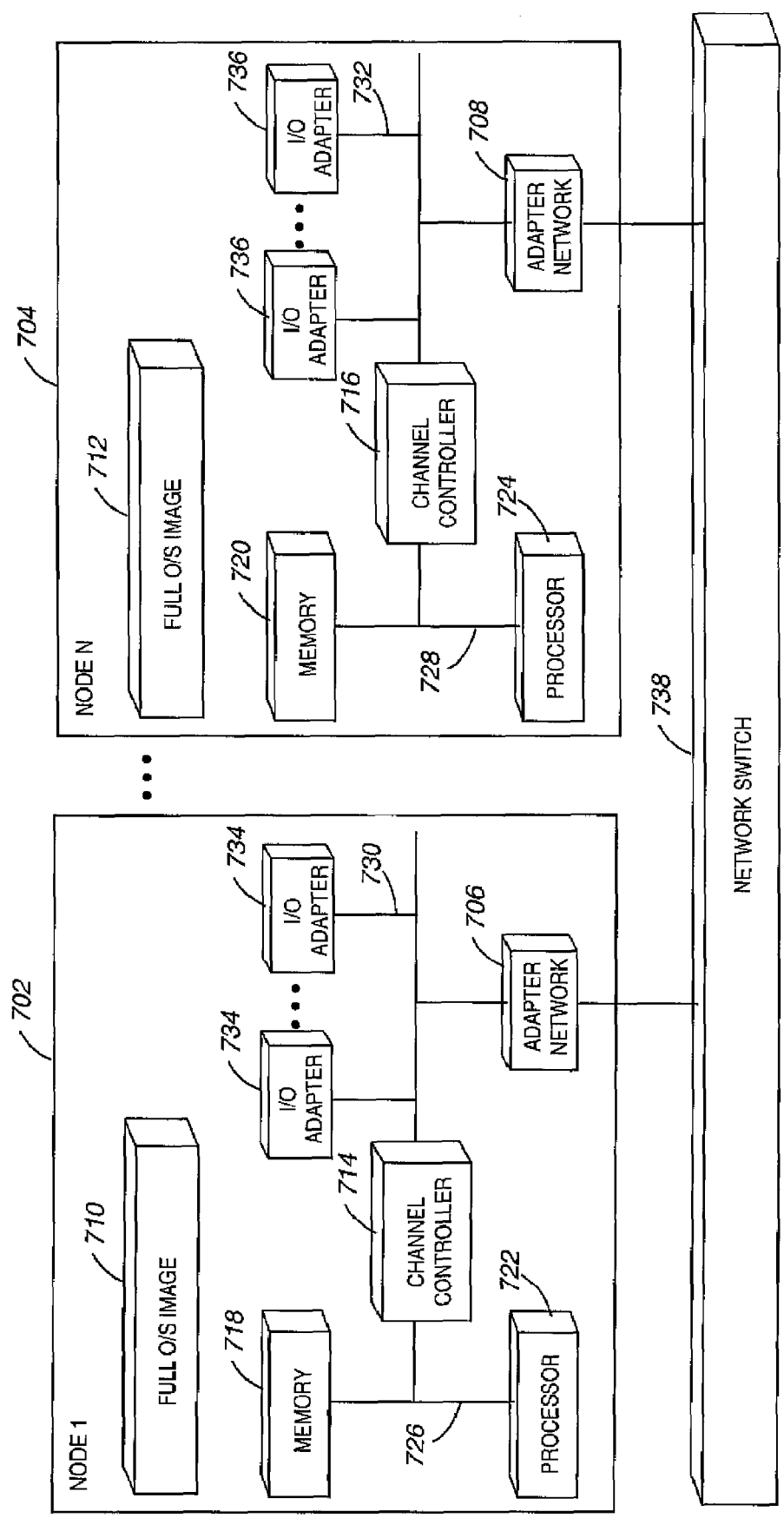
FIG. 7 is a block diagram illustrating an exemplary system architecture according to an embodiment of the present invention.

FIG. 7 is a block diagram illustrating an exemplary architecture for the distributed processing system of FIG. 1. In one embodiment, the distributed processing system 100 can operate in an SMP computing environment. The distributed processing system 100 executes on a plurality of processing nodes 702, 704 coupled to one another node via a plurality of network adapters 706, 708. Each processing node 702, 704 is an independent computer with its own operating system image 710, 712, channel controller 714, 716, memory 718, 720, and processor(s) 722, 724 on a system memory bus 726, 728, a system input/output bus 730, 732 couples 110 adapters 734, 736 and network adapter 706, 708. Although only one processor 722, 724 is shown in each processing node 702, 704, each processing node 702, 704 is capable of having more than one processor. Each network adapter is linked together via a network switch 738. In some embodiments, the various processing nodes 702, 704 are able to be part of a processing cluster. All of these variations are considered a part of the claimed invention. It should be noted that the present invention is also applicable to a single information processing system.

Information Processing System

Figure 8:
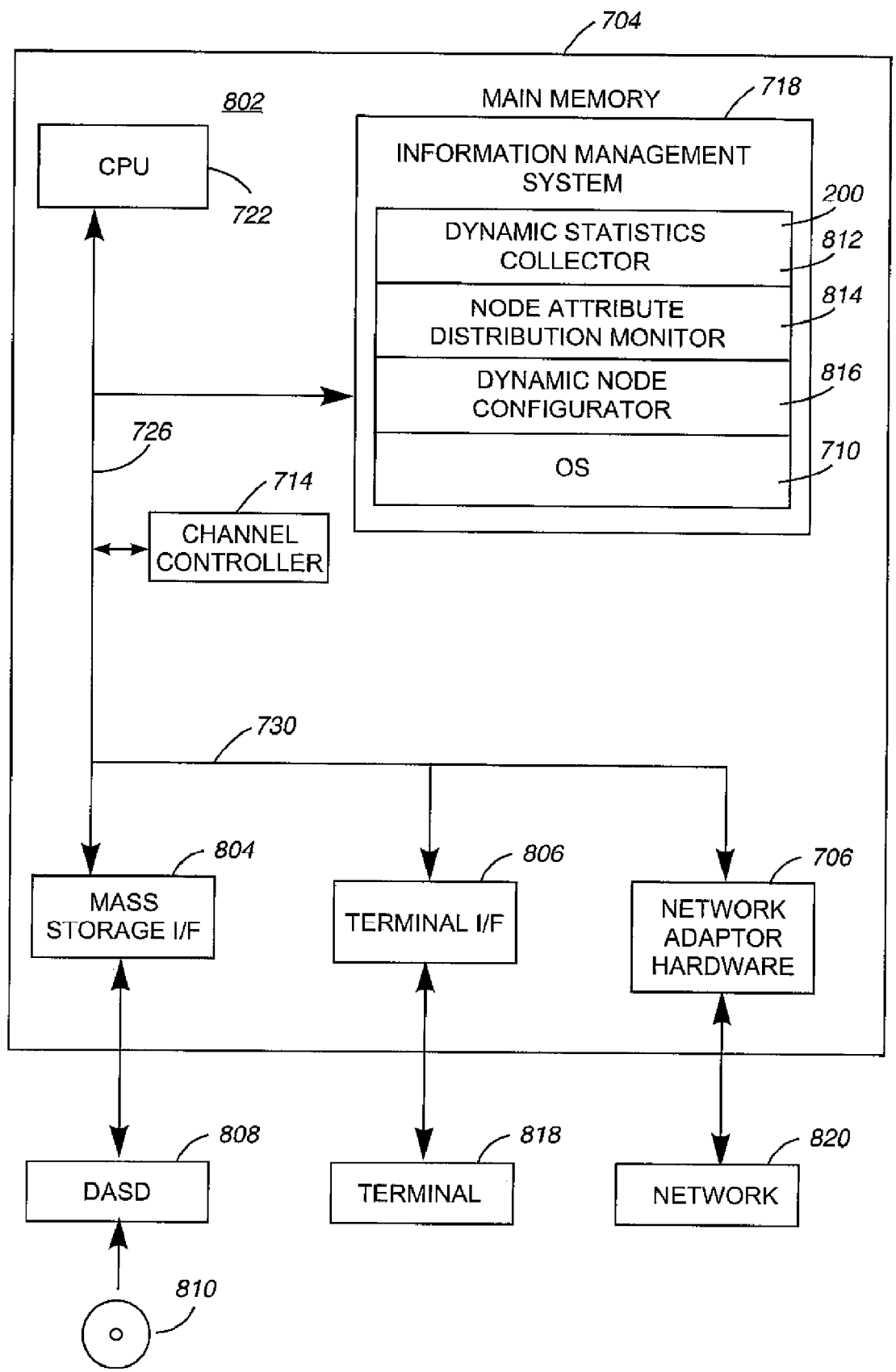
FIG. 8 is a more detailed view of the processing nodes of FIG. 7 according to an embodiment of the present invention.

FIG. 8 is a block diagram illustrating a more detailed view of the processing node 704 of FIG. 7, which from hereon in is referred to as information processing system 800. In one embodiment, the information processing system 800 is the management node 104 of FIG. 1. The information processing system 704 is based upon a suitably configured processing system adapted to implement the exemplary embodiment of the present invention. Any suitably configured processing system is similarly able to be used as the information processing system 704 by embodiments of the present invention, for example, a personal computer, workstation, or the like. The information processing system 704 includes a computer 802. The computer 802 includes a processor 722, main memory 718, and a channel controller 714 on a system bus 726. A system input/output bus 730 couples a mass storage interface 804, a terminal interface 806 and a network hardware 706. The mass storage interface 804 is used to connect mass storage devices such as data storage device 808 to the information processing system 704. One specific type of data storage device is a computer readable medium such as a CD drive or DVD drive, which may be used to store data to and read data from a CD 810 (or DVD). Another type of data storage device is a data storage device configured to support, for example, NTFS type file system operations.

The main memory 718, in one embodiment, includes the information management system 200, which dynamically configures a subset of overlay nodes 102 to periodically push a subset of their attribute data. The subset of nodes and attributes are selected so that most queries can be resolved by the push data. For the remaining queries, the information management system 200 invokes pull operations on-demand to acquire the necessary information for their resolution. The information management system 200 has been discussed above in greater detail. The information management system 200, in one embodiment, includes a dynamic statistics collector 812, a node attribute distribution monitor 814, and a dynamic node configurator 816.

The dynamic statistics collector 812, in one embodiment, collects statistics such as frequently queried attributes, frequently queried range values and frequent staleness constraints. These statistics have been discussed in greater detail above. The node attribute distribution monitor 814, in one embodiment, monitors attribute distribution for estimating probing costs and the push cost reduction and pull cost increase when filtering thresholds are configured. Node attribute distribution has been discussed above in greater detail. The dynamic node configurator 816, in one embodiment, configures a subset of overlay nodes 102 to periodically push a subset of their attribute data based on the dynamic statistical and node attribute distribution information. The dynamic node configurator 816 also dynamically configures the subset of attributes that are to be pushed, the push triggering threshold (filtering threshold) for each selected attribute, and the update interval for each pushed attribute.

Although only one CPU 722 is illustrated for computer 802, computer systems with multiple CPUs can be used equally effectively. Embodiments of the present invention further incorporate interfaces that each includes separate, fully programmed microprocessors that are used to off-load processing from the CPU 722. The terminal interface 806 is used to directly connect the information processing system 704 with one or more terminals 818 to the information processing system 704 for providing a user interface to the computer 802. These terminals 818, which are able to be non-intelligent or fully programmable workstations, are used to allow system administrators and users to communicate with the information processing system 104. A terminal 818 is also able to consist of user interface and peripheral devices that are connected to computer 802.

An operating system image 710 included in the main memory 718 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 106. The network adapter hardware 106 is used to provide an interface to a network 820 such as a wireless network, WLAN, LAN, or the like. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via a CD/DVD, e.g. CD 810, or other form of recordable media, or via any type of electronic transmission mechanism.

Overall Process of Dynamically Configuring Nodes in a Distributed System

Figure 9:
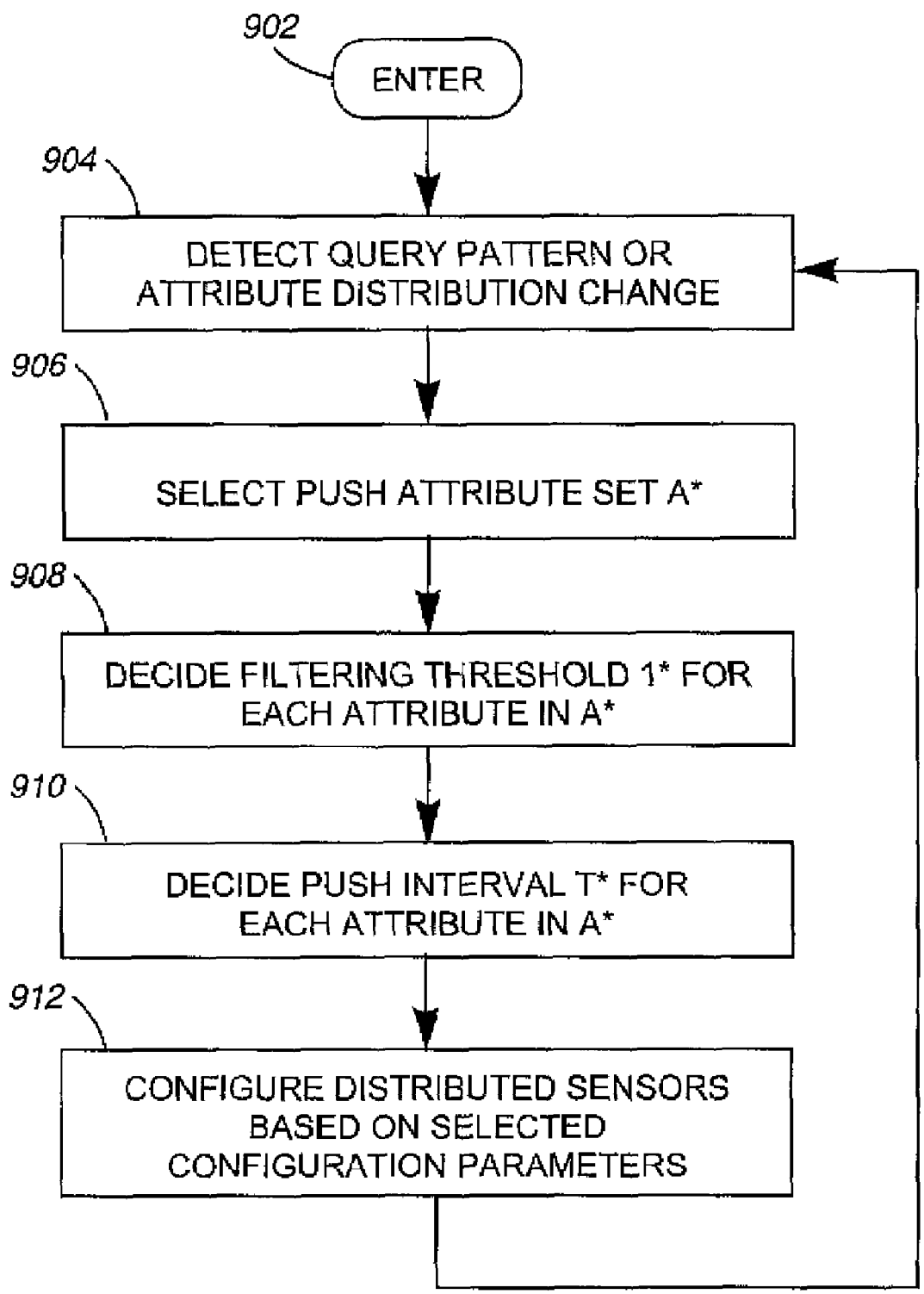
FIG. 9 is an operational flow diagram illustrating overall process of dynamically configuring overlay nodes in a distributed processing system according to an embodiment of the present invention.

FIG. 9 illustrates an overall process for dynamically configuring the overlay nodes 102 to reduce system costs. The operational flow diagram of FIG. 9 begins at step 902 and flows directly to step 904. The information management system 200, at step 904, detects a query pattern of attribute distribution changes. The information management system 200, at step 906, selects a push attribute set. A filtering threshold, at step 908, is determined by the information management system 200 for each attribute in the push attribute set. The information processing system 200, at step 910, determines a push interval for each attribute in the push attribute set. The information management system 200, at step 912, dynamically configures the overlay nodes 102 via their monitoring sensor modules 106 based on the above selected configuration parameters. This process is repeated each time a query pattern of node attribute distribution change is detected.

Exemplary Process of Selecting Attributes

Figure 10:
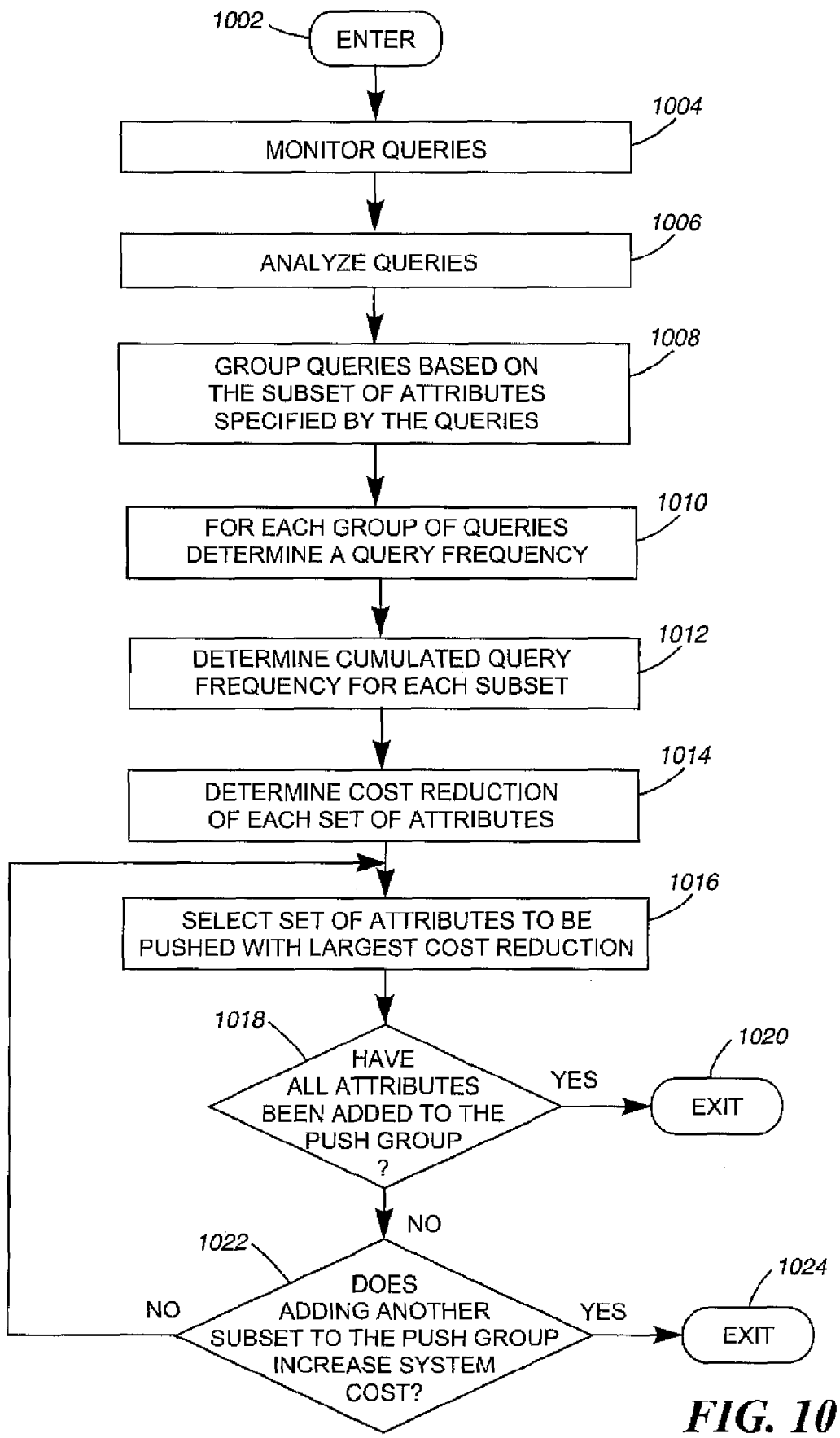
FIG. 10 is an operational flow diagram illustrating an exemplary process of processing selecting an attribute set to be pushed by an overlay node according to an embodiment of the present invention.

FIG. 10 illustrates an exemplary process of selecting an attribute set. The operational flow diagram of FIG. 10 begins at step 1002 and flows directly to step 1004. The information management system 200, at step 1004, monitors received queries. The queries, at step 1006, are analyzed to determined the request attributes. The queries, at step 1008, are grouped together based on the subset of attributes specified by the queries. The information management system 200, a step 1010, determines a query frequency for each subset of attributes. The query frequency, as discussed above, is the percentage of all queries that are represented by each subset of attributes. A cumulative query frequency, at step 1012, is determined, which is the percentage of queries that can be resolved by push data if the attributes in a given set of attributes are pushed.

The information management system 200, at step 1014, determines the cost reduction of each subset of attributes. The cost reduction, in one embodiment, is the amount of pull cost saved minus the additional push cost incurred if all attributes in a set of attributes are pushed. The information management system 200, at step 1016, selects the attribute set with the largest cost reduction. The information management system 200, at step 1018, determines if every attribute has been added to the group of attributes that are to be pushed. If the result of this determination is positive, the control flow exits at step 1020. If the result of this determination is negative, the information management system 200, at step 1022, determines if adding another attribute subset increases the system cost. If the result of this determination is positive, the control flow exits at step 1024. If the result of this determination is negative, the control returns to step 1018, where the information management system 200 selects the next attribute set reduces the system cost the most.

Exemplary Process of Configuring a Filtering Threshold

Figure 11:
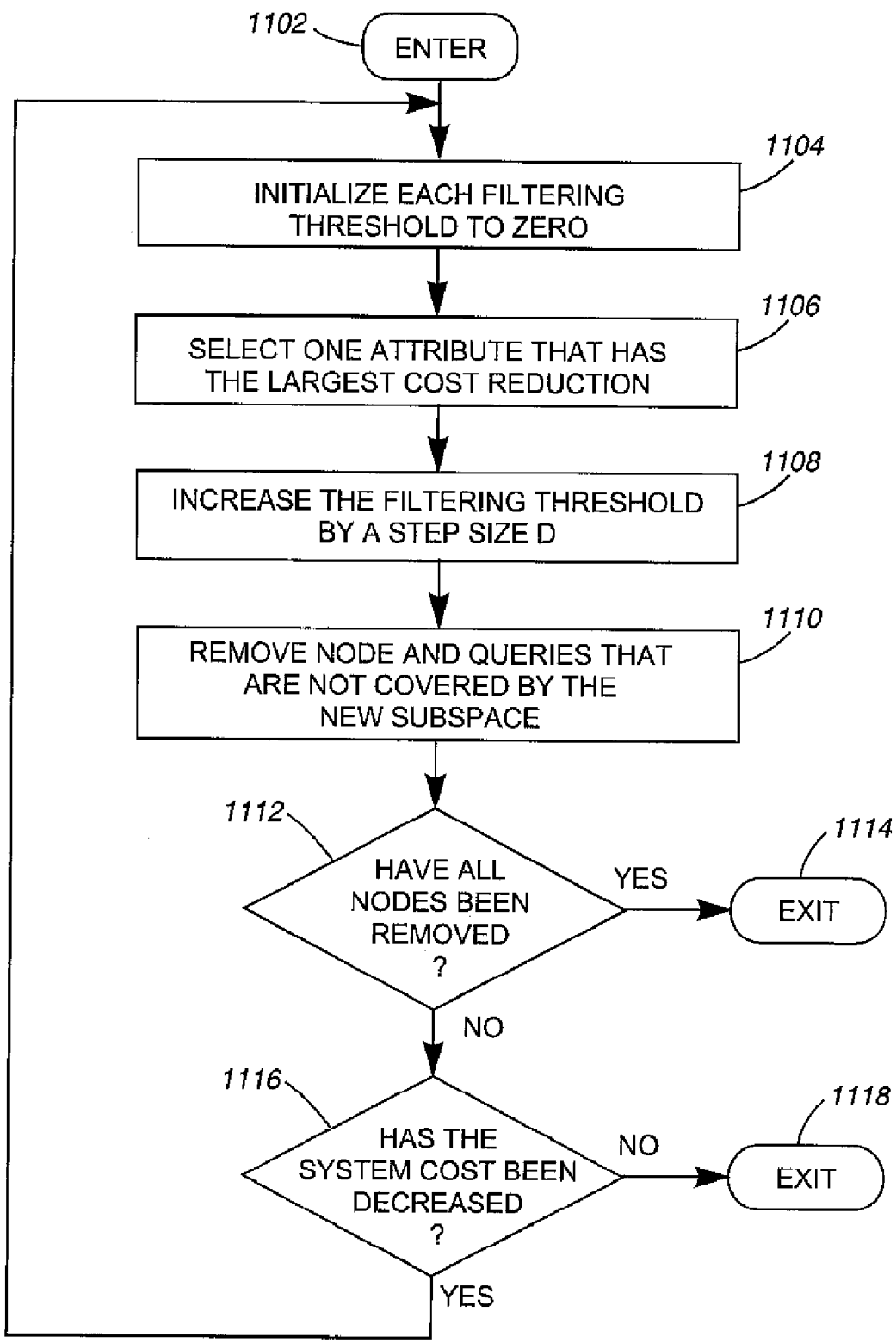
FIG. 11 is an operational flow diagram illustrating an exemplary process of configuring a filtering threshold according to an embodiment of the present invention.

FIG. 11 illustrates an exemplary process of configuring a filtering threshold discussed above. The operational flow diagram of FIG. 11 begins at step 1102 and flows directly to step 1104. The information management system 200, at step 1104, initializes each filtering threshold to zero. The information management system 200, at step 1106, selects at least one attribute that has the largest cost reduction. The filtering threshold, at step 1108, is increased by a step size d. The information management system 200, at step 1110, removes the nodes and queries that are not covered by the new subspace. The information management system 200, at step 1112, determines if all the nodes have been removed. If the result of this determination is positive, the control flow exits at step 1114. If the result of this determination is negative, the information management system 200, at step 1116, determines if the system cost has been decreased. If the result of this determination is negative, the control flow exits at step 1118. If the result of this determination is positive the control flow retunes to step 1104 and the above process is repeated.

Exemplary Process of Configuring a Push Interval

Figure 12:
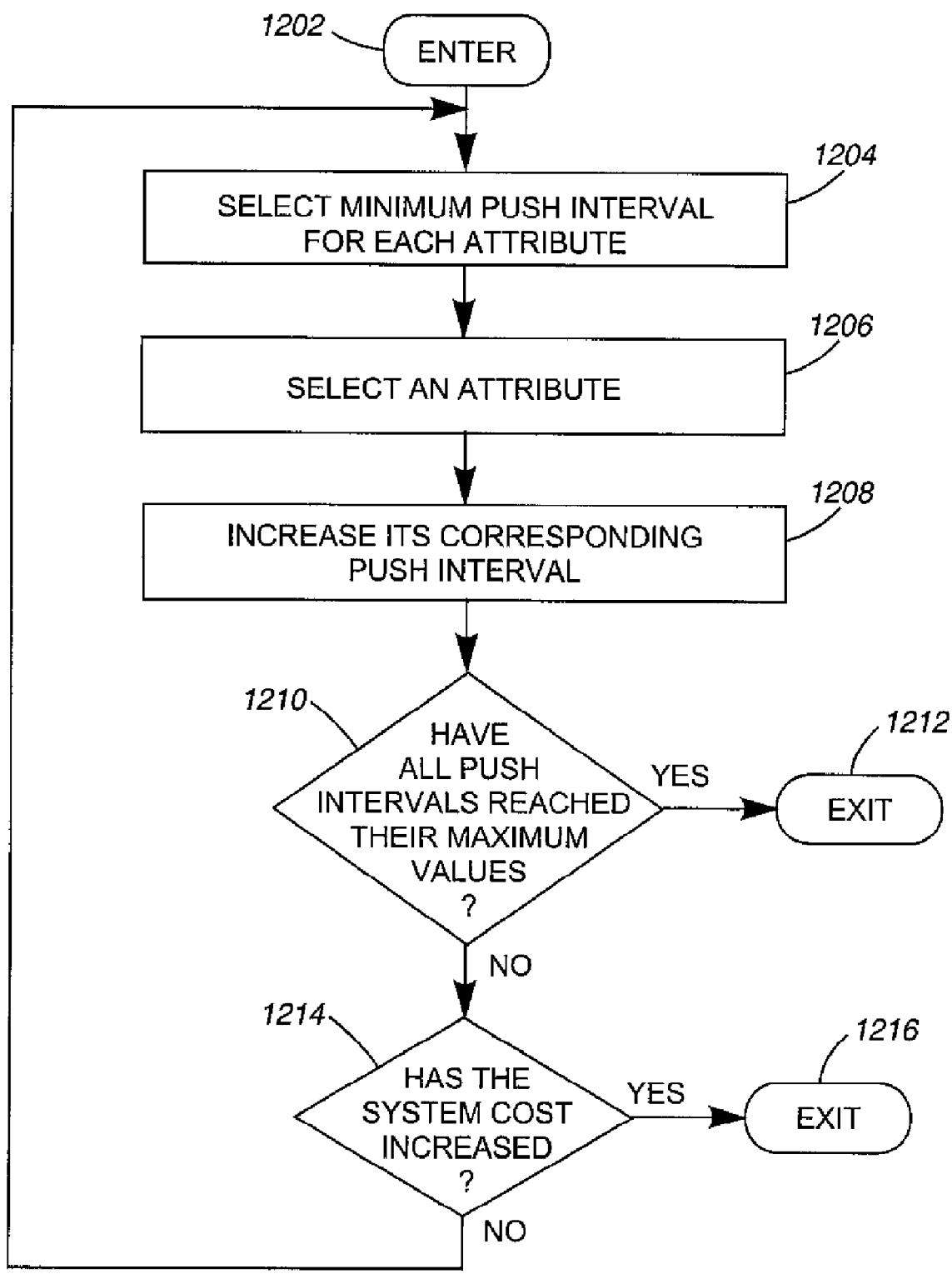
FIG. 12 is an operational flow diagram illustrating an exemplary process of configuring a push interval according to an embodiment of the present invention.

FIG. 12 illustrates an exemplary process of configuring a push interval discussed above. The operational flow diagram of FIG. 12 begins at step 1202 and flows directly to step 1204. The information management system 200, at step 1204, selects a minimum push interval for each attribute in the collection of attribute sets. The push interval determines how often an overlay node 102 reports up-to-date attribute values to the information management system 200 when the value is above the filtering threshold. An attribute, at step 1206 is repeatedly selected and its corresponding push interval, at step 1208, is increased. In one embodiment, an attribute is selected such that the increase of the its push interval results in the largest cost reduction. The information management system 200, at step 1210, if all push intervals reached their maximum values. If the result of this determination positive, the control flow exits at step 1212. If the result of this determination is negative, the information management system 200, at step 1214, determines if the system cost has increased. If the result of this determination is positive, the control flow exits at step 1216. If the result of this determination is negative, the control flow returns to step 1204 and the above process is repeated.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for managing data collection in a distributed processing system, the method on an information processing system comprising:

dynamically collecting at least one statistical query pattern associated with a plurality of queries received from a plurality of client nodes in a distributed processing system;

dynamically monitoring at least one operating attribute distribution across a plurality of overlay nodes, wherein the at least one operating attribute distribution is associated with an operating attribute that has been queried by at least one of the client nodes for the plurality of overlay nodes in the distributed processing system, wherein an overlay node performs one or more data stream processing functions, and wherein an operating attribute is a distributed resource consumable by the at least one of the client nodes;

dynamically, and without user intervention, selecting a first set of overlay nodes from the plurality of overlay nodes based on the at least one statistical query pattern and the at least one operating attribute distribution; and dynamically configuring without user intervention, based on the query pattern and the operating attribute distribution, the first group of overlay nodes to periodically push a first set of operating attributes associated with each overlay node in the selected group to a managing node associated with at least the first group of overlay nodes, wherein the first group of overlay nodes and the first set of operating attributes are selected so that a majority of queries received by client nodes are resolved by the first set of operating attributes that have been pushed, and wherein on-demand pull operations are performed on a second group overlay nodes within the distributed processing system to acquire a second set of operating attributes to resolve queries received from client nodes in which the first set of operating attributes that have been pushed have failed to resolve.

2. The method of claim 1, wherein the operating attribute is at least one of:

an environmental attribute;

a software attribute; and a hardware attribute.

3. The method of claim 1, wherein the dynamically collecting the statistical query pattern further includes collecting statistical information on at least one of:

frequently queried attributes;

frequently queried range values; and frequent staleness constraints.

4. The method of claim 1, wherein the dynamically configuring further comprises at least one of:

dynamically selecting the first set of attributes associated with the first group from a set of available operating attributes associated with each overlay node within the first group;

dynamically configuring a push triggering threshold associated with the operating attribute; and dynamically configuring an update interval for each attribute in the set of operating attributes.

5. The method of claim 4, wherein the dynamically configuring of the push triggering threshold and the update interval is based on a set of data queries that are chosen from a historical list of data queries.

6. The method of claim 4, wherein the dynamically configuring of the push triggering threshold and the update interval minimizes a system cost comprising at least one of:

a push cost for distributed hosts to periodically send information to a manager node;

a pull cost for the manager node to dynamically retrieve information from at least one distributed host.

7. The method of claim 4, wherein the push triggering threshold filters out any overlay node that fails to satisfy a data query.

8. The method of claim 4, wherein the dynamically selecting the set of attributes further comprises:
grouping data queries based on operating attributes specified by the data queries as a push subset;
identifying a collection of operating attribute subsets, wherein for each operating attribute subset in the collection of operating attribute subsets,
determining a cumulative query frequency for each set of operating attributes;
determining a cost reduction value for each set of operating attributes; and
identifying an operating attribute subset comprising a largest cost reduction value;
adding the operating attribute subset comprising the largest cost reduction value to the push subset
removing attributes included in the operating attribute subset comprising the largest cost reduction value from each operating attribute subset in the collection of operating attribute subsets; and
merging together any operating attribute subsets comprising duplicate operating attributes.

9. The method of claim 4, wherein the dynamically configuring a push triggering threshold further comprises:
performing query positioning based on the operating attribute distribution.

10. The method of claim 4, wherein the dynamically configuring a push triggering threshold, further comprises:
initializing the push triggering threshold to its minimum value;
selecting an attribute subset with a largest cost reduction value;
increasing the push triggering threshold until the cost reduction value is above a given threshold; and
identifying, based on the push triggering threshold, any information processing nodes that satisfy the push triggering threshold for calculating a push cost; and
identifying, based on the push triggering threshold, each query in a historical list of data queries that fail to be satisfied by a push data operation for calculating a pull cost.

11. The method of claim 10, wherein the dynamically configuring the update interval update is further based on a query response time constraint, wherein the update interval minimizes monitoring traffic for satisfying a data query.

12. An information processing system for managing data collection in a distributed processing system, the information processing system comprising:
a memory;
a processor communicatively to the memory; and
an information management system communicatively coupled to the memory and the processor, the information management system for:
dynamically collecting at least one statistical query pattern associated with a plurality of queries received from a plurality of client nodes in a distributed processing system;
dynamically monitoring at least one operating attribute distribution across a plurality of overlay nodes, wherein the at least one operating attribute distribution is associated with an operating attribute that has been queried by at least one of the client nodes for the plurality of overlay nodes in the distributed processing system, wherein an overlay node performs one or more data stream processing functions, and wherein the at least one operating attribute is a distributed resource consumable by the at least one of the client nodes;
dynamically, and without user intervention, selecting a first set of overlay nodes from the plurality of overlay nodes based on the at least one statistical query pattern and the at least one operating attribute distribution; and
dynamically configuring, based on the query pattern and the operating attribute distribution, the first group of overlay nodes to periodically push a first set of operating attributes associated with each overlay node in the selected group to a managing node associated with at least the first group of overlay nodes, wherein the first group of overlay nodes and the first set of operating attributes are selected so that a majority of queries received by client nodes are resolved by the first set of operating attributes that have been pushed, and wherein on-demand pull operations are performed on a second group overlay nodes within the distributed processing system to acquire a second set of operating attributes to resolve queries received from client nodes in which the first set of operating attributes that have been pushed have failed to resolve.

13. The information processing system of claim 12, wherein the dynamically configuring further comprises at least one of:
dynamically selecting the first set of attributes associated with the first group from a set of available operating attributes associated with each information processing node within the first group;
dynamically configuring a push triggering threshold associated with the operating attribute; and
dynamically configuring an update interval for each attribute in the set of operating attributes.

14. The information processing system of claim 13, wherein the dynamically selecting the set of attributes further comprises:
grouping data queries based on operating attributes specified by the data queries as a push subset;
identifying a collection of operating attribute subsets, wherein for each operating attribute subset in the collection of operating attribute subsets,
determining a cumulative query frequency for each set of operating attributes;
determining a cost reduction value for each set of operating attributes; and
identifying an operating attribute subset comprising a largest cost reduction value;
adding the operating attribute subset comprising the largest cost reduction value to the push subset
removing attributes included in the operating attribute subset comprising the largest cost reduction value from each operating attribute subset in the collection of operating attribute subsets; and
merging together any operating attribute subsets comprising duplicate operating attributes.

15. The information processing system of claim 13, wherein the dynamically configuring a push triggering threshold, further comprises:
initializing the push triggering threshold to its minimum value;
selecting an attribute subset with a largest cost reduction value;
increasing the push triggering threshold until the cost reduction value is above a given threshold; and identifying, based on the push triggering threshold, any information processing nodes that satisfy the push triggering threshold for calculating a push cost; and identifying, based on the push triggering threshold, each query in a historical list of data queries that fail to be satisfied by a push data operation for calculating a pull cost.

16. A tangible computer readable medium for managing data collection in a distributed processing system, the computer readable medium comprising instructions for:

dynamically monitoring at least one operating attribute distribution across a plurality of overlay nodes, wherein the at least one operating attribute distribution is associated with an operating attribute that has been queried by at least one of a plurality of client nodes for the plurality of overlay nodes in the distributed processing system, wherein an overlay node performs one or more data stream processing functions, and wherein the at least one operating attribute is a distributed resource consumable by the at least one of the client nodes;

dynamically, and without user intervention, selecting a first set of overlay nodes from the plurality of overlay nodes based on the at least one statistical query pattern and the at least one operating attribute distribution; and dynamically configuring, based on the query pattern and the operating attribute distribution, the first group of overlay nodes to periodically push a first set of operating attributes associated with each overlay node in the selected group to a managing node associated with at least the first group of overlay nodes, wherein the first group of overlay nodes and the first set of operating attributes are selected so that a majority of queries received by client nodes are resolved by the first set of operating attributes that have been pushed, and wherein on-demand pull operations are performed on a second group overlay nodes within the distributed processing system to acquire a second set of operating attributes to resolve queries received from client nodes in which the first set of operating attributes that have been pushed have failed to resolve.

17. The tangible computer readable medium of claim 16, wherein the instructions for dynamically configuring further comprise instructions for at least one of:

dynamically selecting the first set of attributes associated with the first group from a set of available operating attributes associated with each information processing node within the first group;

dynamically configuring a push triggering threshold associated with the operating attribute; and dynamically configuring an update interval for each attribute in the set of operating attributes.

18. The tangible computer readable medium of claim 17, wherein the instructions for dynamically selecting the set of attributes further comprise instructions for:

grouping data queries based on operating attributes specified by the data queries as a push subset;

identifying a collection of operating attribute subsets, wherein for each operating attribute subset in the collection of operating attribute subsets, determining a cumulative query frequency for each set of operating attributes;

determining a cost reduction value for each set of operating attributes; and identifying an operating attribute subset comprising a largest cost reduction value;

adding the operating attribute subset comprising the largest cost reduction value to the push subset removing attributes included in the operating attribute subset comprising the largest cost reduction value from each operating attribute subset in the collection of operating attribute subsets; and merging together any operating attribute subsets comprising duplicate operating attributes.

19. The tangible computer readable medium of claim 17, wherein the instructions for dynamically configuring a push triggering threshold further comprise instructions for:

initializing the push triggering threshold to its minimum value;

selecting an attribute subset with a largest cost reduction value;

increasing the push triggering threshold until the cost reduction value is above a given threshold; and identifying, based on the push triggering threshold, any information processing nodes that satisfy the push triggering threshold for calculating a push cost; and identifying, based on the push triggering threshold, each query in a historical list of data queries that fail to be satisfied by a push data operation for calculating a pull cost.

20. The tangible computer readable medium of claim 16, wherein the instructions for dynamically collecting the statistical query pattern further include instructions for collecting statistical information on at least one of:

frequently queried attributes;

frequently queried range values; and frequent staleness constraints.

* * * * *